United States Patent [19]

Schäfer et al.

[11] Patent Number: 5,799,524
[45] Date of Patent: Sep. 1, 1998

[54] PRESSURE FORMING AND PIERCING A HOLLOW BODY

[75] Inventors: August Wilhelm Schäfer, Drolshagen; Hans Werner Scholz, Wolfsburg; Adolf Handel, Braunschweig, all of Germany

[73] Assignee: Schafer Hydroforming GmbH & Co., Wilnsdorf, Germany

[21] Appl. No.: 698,994

[22] Filed: Aug. 16, 1996

[30] Foreign Application Priority Data

Aug. 16, 1995 [DE] Germany ............ 195 30 055.6

[51] Int. Cl.⁶ ................................. B21D 28/28
[52] U.S. Cl. .................... 72/55; 83/53; 29/421.1; 72/56
[58] Field of Search ................ 72/55, 56; 83/53, 83/177; 29/421.1

[56] References Cited

U.S. PATENT DOCUMENTS

| | | |
|---|---|---|
| 3,991,456 | 11/1976 | Lieser ........................ 72/55 |
| 4,989,482 | 2/1991 | Mason ........................ 72/55 |
| 5,398,533 | 3/1995 | Shimanovski et al. ............ 72/55 |
| 5,460,026 | 10/1995 | Schafer ...................... 72/55 |

FOREIGN PATENT DOCUMENTS

| | | |
|---|---|---|
| 0588528 | 3/1994 | European Pat. Off. . |
| 0593950 | 4/1994 | European Pat. Off. . |
| 1602394 | 12/1971 | Germany . |
| 4322063 | 8/1994 | Germany . |
| 290627 | 11/1990 | Japan ........................ 72/328 |
| 820976 | 4/1981 | U.S.S.R. .................... 72/55 |

OTHER PUBLICATIONS

Alan D. Eldred et al; "Vari–Form –a hydroforming technique for manufacturing complex tubular components"; 1 Apr. 1994; Technische Mitteilungen Krupp; pp. 45–50.

*Primary Examiner*—David Jones
*Attorney, Agent, or Firm*—Herbert Dubno; Andrew Wilford

[57] ABSTRACT

A shaped and pierced hollow workpiece is made by first confining a hollow metal blank in a cavity of a die which has an inner surface and is formed with a lateral compartment. The blank is internally pressurized to press it outward against the inner surface of the cavity while forming at the compartment an outwardly projecting bulge. A tool is pressed against an outer surface of the bulge and the bulge is pressed inward so as to at least partially to invert it and press a central portion of the bulge against an opposite inside wall of the blank. A hole is then machined through the blank where the central portion of the bulge engages the opposite inside wall.

12 Claims, 3 Drawing Sheets

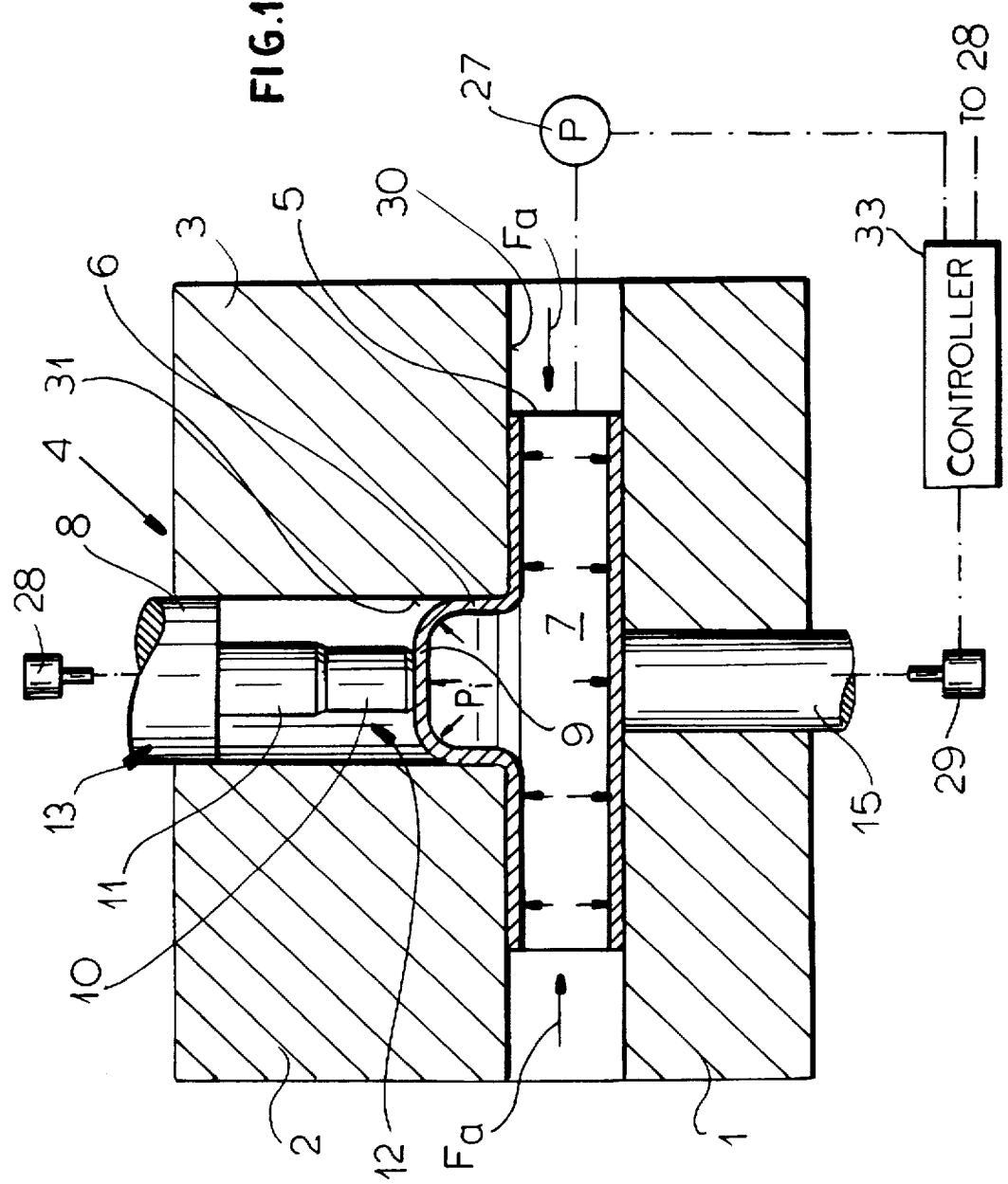

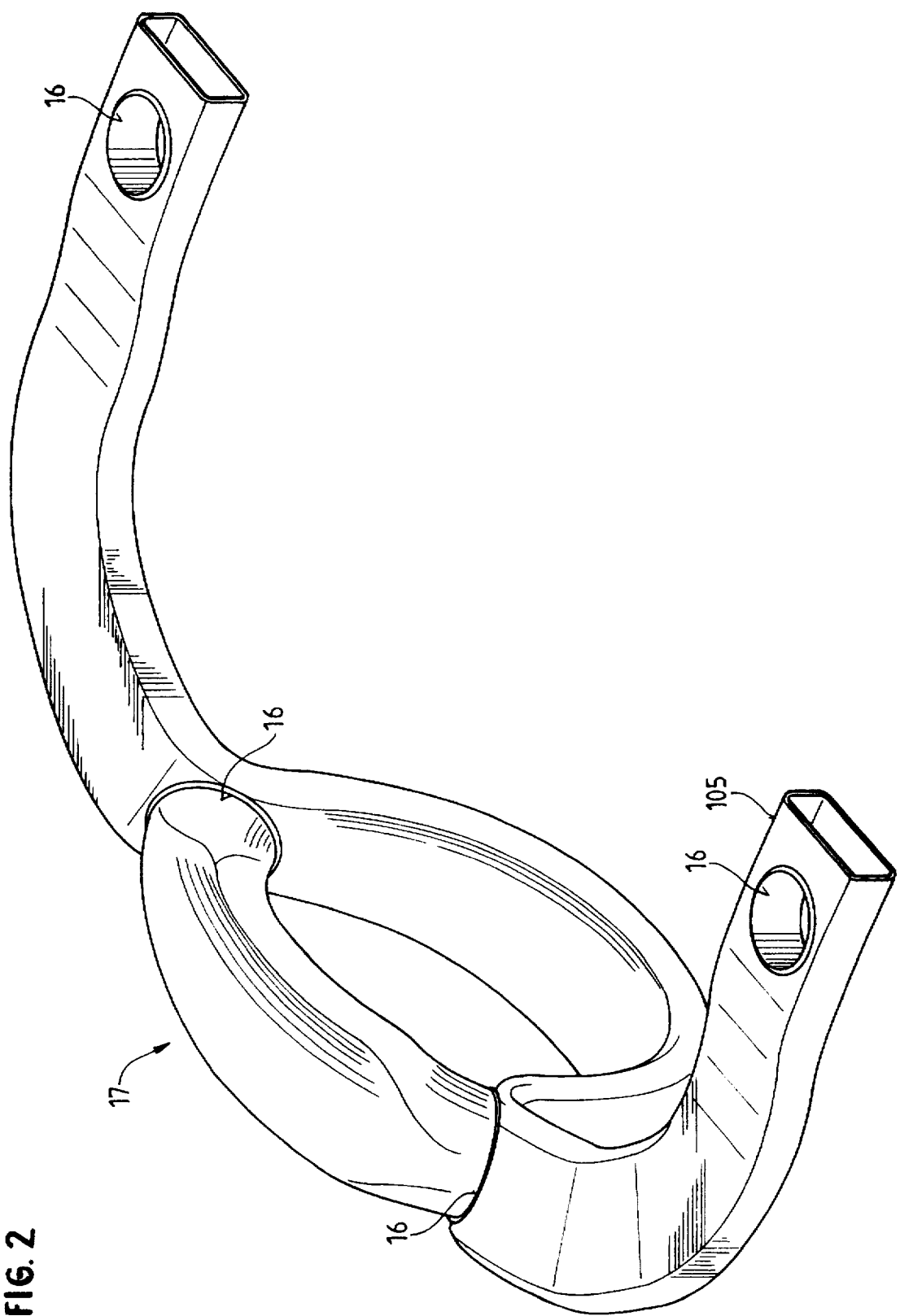

PRESSURE FORMING AND PIERCING A HOLLOW BODY

FIELD OF THE INVENTION

The present invention relates to the pressure forming of a hollow body. More particularly this invention concerns a method of forming an accurate double-walled hole through a pressure-formed body.

BACKGROUND OF THE INVENTION

As described in my copending application 08/422,588 filed 14 Apr. 1995 it is known to bulge-form a tubular workpiece by means of an apparatus that has a stationary base, a die fixed on the base and formed with a cavity having an inner surface and axially oppositely open ends so that a tubular workpiece can be held in the cavity with ends of the workpiece exposed at the ends of the cavity, and a pair of pistons fittable with the workpiece ends. Respective actuators can displace the pistons toward each other and against the ends of the workpiece in the cavity. A hydraulic liquid is fed at high pressure through one of the pistons to an interior of the workpiece in the cavity to deform the workpiece. With such an arrangement (See also "Werkstattechnik 79 (1989)", VDI-Fortschrittsberichte, Series 2, No. 142, VDI-Verlag 1987) the enormous internal pressure deforms the workpiece so that its outside surface corresponds exactly to the shape of the inside surface of the die.

When such workpieces are used as load-bearing elements, for instance in motor-vehicle construction where tubular elements are preferred to solid ones in order to reduce weight, it is frequently necessary to connect transverse links or other elements to them, for instance support elements for front-end shock absorbers. To this end the hollow body must be pierced to provide an attachment location for this other part which is fitted to the holes by means of appropriate bushings. The formation of these mounting holes is a fairly complex procedure normally entailing several steps after formation of the part, and at best the holes normally substantially weaken the part.

OBJECTS OF THE INVENTION

It is therefore an object of the present invention to provide an improved method of and apparatus for pressure forming and piercing a hollow workpiece.

Another object is the provision of such an improved method of and apparatus for pressure forming and piercing a hollow workpiece which overcomes the above-given disadvantages, that is which allows the workpiece to be formed with a hole in a simple manner without weakening the workpiece excessively.

SUMMARY OF THE INVENTION

A shaped and pierced hollow workpiece is made according to the invention by first confining a hollow metal blank in a cavity of a die which has an inner surface and is formed with a lateral compartment. The blank is internally pressurized to press it outward against the inner surface of the cavity while forming at the compartment an outwardly projecting bulge. A tool is pressed against an outer surface of the bulge and the bulge is pressed inward so as to at least partially to invert it and press a central portion of the bulge against an opposite inside wall of the blank. A hole is then machined through the blank where the central portion of the bulge engages the opposite inside wall.

The result is a hollow workpiece with a throughgoing hole that is lined with a unitary piece of the workpiece wall. The workpiece is extremely strong due to its one-piece essentially seamless construction and is produced in a very simple and inexpensive manner. The hole can be formed according to the invention by punching through the blank with the tool. Thus no subsequent machining is needed, as the finished workpiece has an exactly formed double-wall hole and no liner bushing is needed for this hole.

The outside wall of the tube opposite the bulge is supported by a movable abutment and the hole is punched by advancing the tool and synchronously retracting the abutment. The tool is advanced at a relatively slow speed during inversion of the bulge and at a relatively fast speed during punching of the hole. The tool is pressed against the blank with a force equal to only slightly more than an internal pressure inside the blank to invert the bulge. This prevents the tool from cutting the workpiece during inversion of the bulge.

Alternately it is possible to form the hole by machining, for instance by drilling while holding the pressure-formed workpiece in a vise. Even so the resultant hole is very accurately dimensioned. The tool is a punch having a sharp edge and a diameter substantially smaller than the diameter of the compartment it moves in. In addition the die is formed opposite the compartment with a passage in which an abutment is displaceable between a position flush with the inner surface of the cavity and a retracted position. The actuator is connected to the abutment for retracting it as the tool is advanced. This abutment has a larger diameter than the tool so that the piece cut out of the bottom wall of the workpiece is larger than the piece cut out of the top wall, ensuring that the inverted wall of the bulge projects down all the way through the workpiece. Furthermore the blank has a wall thickness and the diameter of the abutment is greater than the diameter of the tool by two times the thickness. The compartment has a diameter greater than that of the lower punch end by a distance equal to at least ten times the wall thickness to ensure that the bulge is inverted and not torn prematurely.

BRIEF DESCRIPTION OF THE DRAWING

The above and other objects, features, and advantages will become more readily apparent from the following description, reference being made to the accompanying drawing in which:

FIG. 1 is a simplified schematic view illustrating the apparatus according to the invention;

FIG. 2 is a perspective view of a workpiece produced according to the invention.

SPECIFIC DESCRIPTION

Figure 3A:
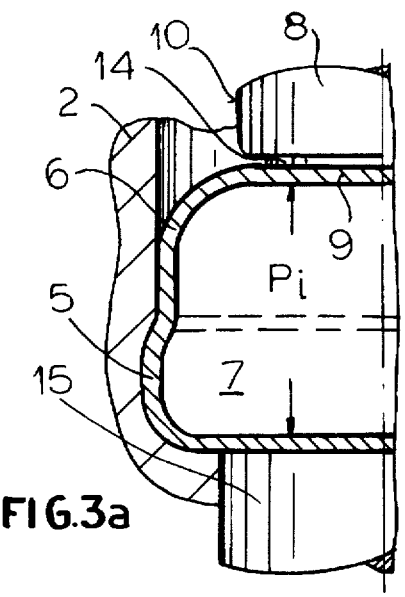
FIGS. 3a through 3f are partial large-scale sectional views illustrating successive stages of the method of this invention.

As seen in FIG. 1 an apparatus according to the invention basically has a die 4 comprised of three separable parts 1, 2, and 3 defining a cavity 30 adapted to hold a tubular workpiece blank 5 and formed on one side with a cylindrical compartment 31 and on its opposite side with a cylindrical passage 32. As is well known the blank 5 is deformed by pressurizing its interior 7 from a pump 27 as indicated by arrows $F_a$ so that it swells radially and its outer surface lies against an inner surface of the cavity 30. In the compartment 31 pressure indicated at $P_i$ will form a bulge 6, but an abutment 15 in the passage 32 has an end flush with the inside surface so that here there is no deformation. This is standard and described in commonly owned U.S. Pat. No. 5,540,026.

Here the bulge 6 stops with an end or center part 9 engaging a tool 8 having a stem 12 with a small-diameter lower end portion 10 and a larger-diameter upper portion 11 connected to a cylindrical body 13 operated by an actuator shown schematically at 28. Another such actuator 29 can displace the cylindrical abutment rod 15 radially of the cylindrical cavity 30 and a controller 33 is connected to both of these actuators 28 and 29 as well as to the pump 27 to control the system.

FIG. 3a shows in larger scale how to start with when the bulge 6 is formed its center part 9 comes to lie flatly against the flat end of the tool 8.

Figure 3B:
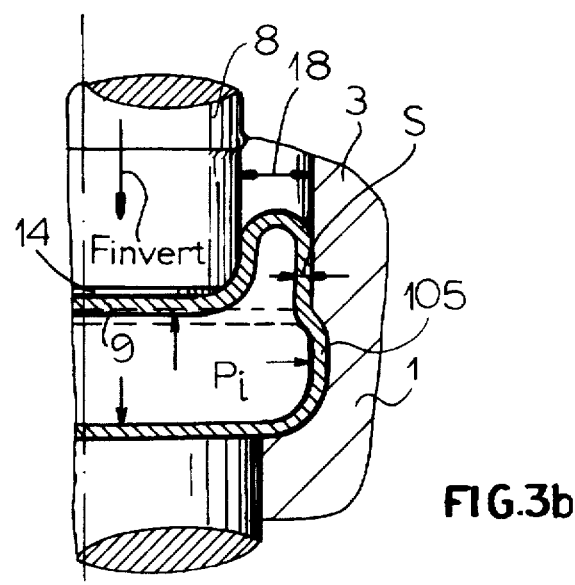

The tool 8 is then moved radially inward as indicated by FIG. 3b. Since the diameter of the tool end 10 is substantially less than the diameter of the compartment 31, with a spacing 18 equal to at least five times the workpiece wall thickness S, this will cause the bulge 6 to be inverted. The force $F_{invert}$ that the tool 8 brings to bear on the workpiece 5 is only slightly more than its internal pressure $P_i$ so that an edge 14 of the tool 8 does not cut the workpiece 5.

Figure 3C:
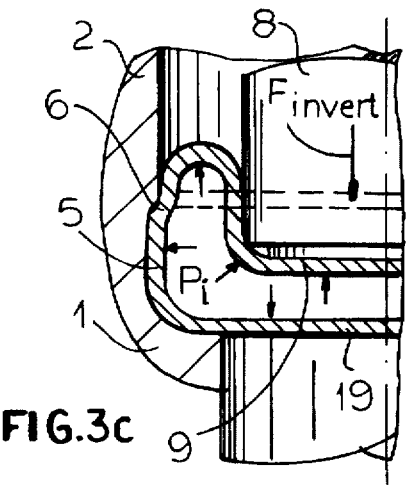
Figure 3D:
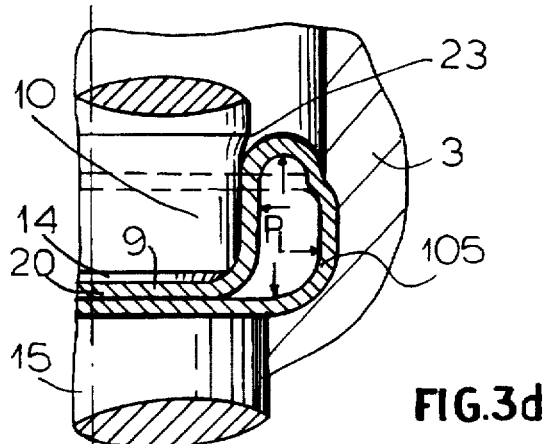

The inversion of the bulge 6 continues as shown in FIG. 3c until as shown in FIG. 3d the center part 9 of the bulge 6 is pressed flatly against an opposite side 19 of the workpiece 5. The two wall portions 9 and 19 lie together at 20. At this time the workpiece 5 can be depressurized and removed from the die 4 so that a hole can be machined, for instance by drilling, through the region 20.

Figure 3E:
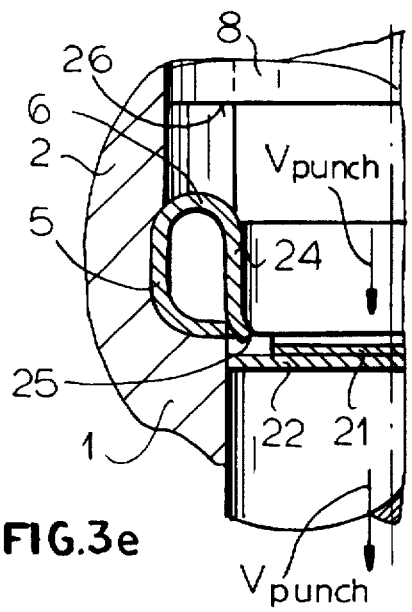
Figure 3F:
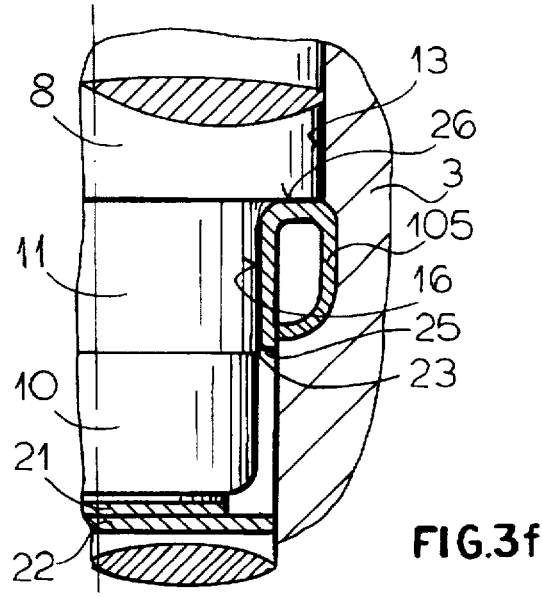

The hitherto relatively slow advance speed of the tool 8 is normally, however, increased at this time to a higher speed $V_{punch}$ so that as shown in FIG. 3e portions 21 and 22 are punched out of the workpiece 5. The portion 22 is of a diameter equal to that of the passage 32 while the portion 21 is smaller in diameter. As this happens the inverted bulge 6 seats against a shoulder 23 between the sections 10 and 11 to prohibit further inversion. The tool 8 is advanced as shown in FIG. 3f until a flat planar shoulder between the portions 11 and 13 engages the top to the inverted bulge 6 and flattens it. Meanwhile the larger-diameter part 11 is forced down in the inverted wall section 24 to expand it and bend out the edge 25 from which the piece 21 was cut. The result is a through hole 16 (FIG. 2) that is of an exactly controlled diameter, corresponding to that of the portion 11 with one side flattened to form a flat seat for an attachment bolt or for another part 17 on the finished workpiece 105.

I claim:

1. A method of making a shaped and pierced hollow workpiece, the method comprising the steps of sequentially:
   confining a hollow metal blank in a cavity of a die, the cavity having an inner surface and being formed with a lateral compartment;
   internally pressurizing the blank and thereby pressing it outward against the inner surface of the cavity while forming at the compartment an outwardly projecting bulge;
   pressing a tool against an outer surface of the bulge and pressing the bulge inward so as to at least partially invert the bulge and press a central portion of the bulge against an opposite inside wall of the blank; and
   forming a hole through the blank where the central portion of the bulge engages the opposite inside wall.

2. The method defined in claim 1 wherein the hole is formed by punching through the blank with the tool.

3. The method defined in claim 2 wherein an outside wall of the tube opposite the bulge is supported by a movable abutment, the hole being punched by advancing the tool and synchronously retracting the abutment.

4. The method defined in claim 3 wherein the tool is advanced at a relatively slow speed during inversion of the bulge and at a relatively fast speed during punching of the hole.

5. The method defined in claim 2 wherein the tool is pressed against the blank with a force equal to only slightly more than an internal pressure inside the blank to invert the bulge.

6. The method defined in claim 1 wherein the hole is formed by machining.

7. The method defined in claim 1 wherein the hole is formed by drilling.

8. An apparatus for making a shaped and pierced hollow workpiece, the apparatus comprising:
   a die adapted to hold a hollow blank and formed with a cavity having an inner surface and a lateral compartment;
   means for internally pressurizing the blank in the cavity and thereby pressing it outward against the inner surface of the cavity while forming at the compartment an outwardly projecting bulge;
   a tool engageable in the compartment against an outer surface of the bulge;
   actuator means connected to the tool for pressing the bulge inward so as to at least partially invert the bulge and press a central portion of the bulge against an opposite inside wall of the blank; and
   means for forming a hole through the blank where the central portion of the bulge engages the opposite inside wall.

9. The shaping and piercing apparatus defined in claim 8 wherein the tool is a punch having a sharp edge.

10. The shaping and piercing apparatus defined in claim 9 wherein the die is formed opposite the compartment with a passage, the apparatus further comprising
   an abutment displaceable in the passage between a position flush with the inner surface of the cavity and a retracted position, the actuator means being connected to the abutment for retracting it as the tool is advanced.

11. The shaping and piercing apparatus defined in claim 10 wherein the abutment has a larger diameter than the tool.

12. The shaping and piercing apparatus defined in claim 11 wherein the blank has a wall thickness and the diameter of the abutment is greater than the diameter of the tool by two times the thickness.

* * * * *